United States Patent [19]

Bandurski

[11] Patent Number: 5,501,718
[45] Date of Patent: Mar. 26, 1996

[54] METHOD TO PRODUCE SUBSTITUTE FOR PEAT MOSS

[76] Inventor: William E. Bandurski, 1084 - 24th St., Des Moines, Iowa 50311

[21] Appl. No.: 387,618

[22] Filed: Feb. 13, 1995

Related U.S. Application Data

[63] Continuation of Ser. No. 223,537, Apr. 5, 1994, abandoned, which is a continuation-in-part of Ser. No. 43,535, Apr. 6, 1993, abandoned.

[51] Int. Cl.$^6$ ............................... C05F 11/08; C05C 9/00
[52] U.S. Cl. ........................ 71/9; 71/10; 71/12; 71/13; 71/14; 71/21; 71/23; 71/24; 71/28
[58] Field of Search ..................... 71/6, 9, 10, 11, 71/12, 13, 14, 15, 21, 23, 24, 28

[56] References Cited

U.S. PATENT DOCUMENTS 4,304,361  12/1981  Campbell ................................. 241/24

FOREIGN PATENT DOCUMENTS 2257697  1/1993  United Kingdom ....................... 71/24

OTHER PUBLICATIONS

C86–059493 "Comp for . . . Microorganisms" Guillon Apr. 1986 (Abst. of FR 2,571,717).
77–006074 "Soil Compost . . . Fermenting" Tanata, Aug. 10, 1976 (Ab. of JP51091171).

*Primary Examiner*—Ferris Lander
*Attorney, Agent, or Firm*—Cushman Darby & Cushman

[57] ABSTRACT

This invention is a method to produce a substitute for peat moss comprising:

mixing in a mixer adsorptive cellulosic material with an effective amount of an inoculum containing cellulose degrading microorganism such as lignin cellulose degrading bacteria upon anaerobic fermentation and manure municipal waste or similar waste, manufactured feedstock or a blend of these, transferring said mixture to a chamber, allowing the temperature of said mixture to rise in said chamber until said cellulosic material changes color, then aerating said mixture to remove water vapor, ammonia and other gases in an exhaust gas and then removing said mixture from said chamber for use as a substitute for peat moss and other uses.

18 Claims, No Drawings

METHOD TO PRODUCE SUBSTITUTE FOR PEAT MOSS

FIELD OF THE INVENTION

This is a continuation of application Ser. No. 08/223,537, filed on Apr. 5, 1994, which was abandoned upon the filing hereof, which is a continuation-in-part application of Ser. No. 08/043,535 filed Apr. 6, 1993, now abandoned.

This invention relates to a method to produce a substitute for peat moss from cellulosic material such as hay or straw, an inoculum which contains a cellulose degrading microorganisms such as ammonia generating bacteria and/or lignin cellulose degrading bacteria and manure, municipal waste or similar waste, manufactured feedstock or a blend of these.

BACKGROUND OF THE INVENTION

The application and incorporation of crop residue and animal manure to soils has been recognized by modern agriculture as providing a number of benefits that enhance crop yields. With today's specialized agricultural enterprises, crop ground is seldom allowed to lie fallow or be placed in green manure crops. Livestock rearing has also become specialized which has resulted in concentration of animal population into confinement operations that may have little, if any, additional crop ground for manure disposal. How the manure is handled not only impacts the profitability of the livestock operation and the environment, but also impacts the overall health of the livestock population.

The concentration of livestock has resulted in the environmental regulation of these enterprises and their waste disposal practices. Currently, many states regulate the amount of waste that can be disposed of upon an area of land, as well as when it may be applied. In fact, where such facilities are near populations, odor control is a factor.

Most manures are at least 80% water. Since the fertilizer value is generally associated with the solids fraction, a number of methods adapted from municipal water treatment, such as screening, digesters, and settling ponds have been used to concentrate the solid fraction. The result is a liquid (supernatant) and a sludge. The former can easily be handled with conventional pumping systems while the latter must be trucked and spread.

The stabilization of organic material has been historically performed using both aerobic and anaerobic fermentation techniques. These techniques include, but are not limited to:

Composting

Composting is an age-old processing used by man and has been studied extensively. The current popularity of the process is to blend municipal sludges and manures with municipal solid waste and other bulking agents, primarily newspaper, wood chips, and sawdust.

Composting may be performed using the following primary methods.

a) Windrow System
b) Static Pile

A number of systems are currently available in the marketplace. Many are custom-designed by various consultants.

Perhaps the best known use of compost is by the mushroom industry. The compost is the bedding material in which the mushrooms are grown.

Municipal based composts are currently being offered as soil amendments in the marketplace. While these products may offer some benefits, they generally lack consistency in their physical qualities. In fact, the content of hazardous chemicals is of such a concern that U.S. EPA is currently drafting regulations.

Anaerobic Digestion

Digestion is classified by the temperature range at which the process occurs. Typical ranges are as follows:

| TEMPERATURE, CENTIGRADE | | |
| --- | --- | --- |
| Type | Range | Optimum |
| Cryophilic | −2–30 | 12–18 |
| Mesophilic | 20–45 | 25–40 |
| Thermophilic | 45–75 | 55–65 |

A common application of mesophilic anaerobic digestion is found in municipal sewage treatment plants where the process is used to stabilize sewage sludge. During the digestion of the sewage sludge, methanogenesis occurs. The methane is then recovered, providing an energy source which is used to maintain the elevated temperature of the digestor and, in some cases, excess gas is used to operate machinery within the plant. The stabilized sludge may be disposed of in landfills, oceans or land applied. All these methods are regulated by the environmental regulatory agencies.

Organic Soil Amendment

Peat moss is a common ingredient in soil mixes and has been well studied. Peat is a mined product, primarily imported from Canada. Because peat is mined from wetlands, environmental pressures have forced the horticultural industry to look at alternatives.

While a number of organic materials, such as composts, are purported to replace peat, a lack of consistent quality has been a problem. Particularly, previously proposed substitutes for peat moss have been inconsistent regarding ingredients and chemical and physical characteristics.

SUMMARY OF THE INVENTION

This invention is a method to produce a substitute for peat moss comprising mixing absorptive cellulosic material with an effective amount of an inoculum containing a lignin cellulose degrading microorganisms such as an ammonia producing bacteria and/or lignin cellulose degrading bacteria and manure, municipal waste or similar waste, manufactured feedstock or a blend of these, transferring the mixture to a chamber, allowing the temperature of the mixture to rise in the chamber until the cellulosic material changes color, then aerating the mixture to remove water vapor and other gases formed in the mixture such as ammonia in an exhaust gas, and then removing the mixture from the chamber for use as a substitute for peat moss.

Preferably, the inoculum is a substitute peat moss produced at a time prior to the practice of this method by the same or a similar method.

Preferably, the cellulosic material is selected from the group consisting of hay, straw and stalks of plants such as corn or soybeans and having a maximum length of three inches. The preferred weight is about 10% to about 20% by weight of inoculum added to the cellulosic material.

The method of this invention also includes adding additional cellulosic material and manure, municipal waste, manufactured feedstock or a blend of these or similar waste subsequently. This is in order to fill the mixer used to mix the materials up to its capacity. The method may be continuous or batch.

Mixing of the materials preferably continues for a time of up to five minutes after the capacity of the mixer is reached. The preferred method is also to permit the temperature in the chamber to rise to between about 135° to 175° F. The mixture should preferably remain in the chamber for about 24 to about 36 hours after the temperature begins to rise. It is also preferable that the chamber be insulated.

The method also includes aeration of the mixture which continues until the mixture is dried to less than preferably 25% of weight by moisture. It is also preferred to recover water vapor, and other gases formed in the mixture such as ammonia from the exhaust gas during aeration. The preferred method of recovery is by passing the exhaust gas through water. The water may also contain material such as lime and other chemicals.

The method preferably comprises an additional step of adding nitrogen-containing compound, such as urea to the mixture. Although, for floricultural uses none is necessary, when used for other uses, it is preferred to add from about 0.5 to about 64 grams of nitrogen-containing compound such as urea per 500 lbs. of the mixture.

Also, water can be added to the resulting mixture to control salinity and concentration of macro and micro nutrients in the mixture.

This invention is also the mixture produced by the method described above.

The following are embodiments of this invention using the mixture produced by the method described above. Thus this invention includes:

a method to absorb and degrade hydrocarbons and other materials such as solvents, pesticides, highly energetic compounds and adsorb, degrade and/or fix dissolved heavy metals and radioactive materials comprising contacting hydrocarbons and/or other fluid materials with the mixture produced by the method described above, the method wherein the hydrocarbons and/or other materials are the result of a spill;

a method to remediate soil contaminated with hydrocarbons and/or the above other materials comprising contacting the soil contaminated with hydrocarbons or other materials with the mixture produced by the method described above;

an organic soil amendment comprising the mixture produced by the method described above; this organic soil amendment may be used as a direct replacement for peat moss in the floriculture and nursery industries;

a fertilizer comprising the mixture produced by the method described above;

a treatment to maintain turf comprising applying the mixture or this invention to the turf; and a treatment method which is used to establish turf on any compacted soil, such as subsoil or sand, which comprises working the mixture produced by the method described above into the top six inches of the soil beneath the turf, when compacted subsoil is treated up to about 30% by weight of the mixture is added and when sand is pretreated from about 10% to about 20% by weight of the mixture of this invention is added to the sand.

This invention is also a method to improve adsorption and degradation of oil spills wherein in a boom at the surface of the spill is used which comprises forming the boom of a fabric or paper filled with the mixture produced by the method described above.

The invention is also a method to filter and degrade hydrocarbons, pesticides, solvents, impure water, including dissolved metal impurities, all of which may be gases or liquids, i.e., fluids, comprising installing the mixture produced by the method described above into a bed filter or packed column and passing the fluids (liquids or gases) through the mixture.

The invention is also a method to remediate or regenerate spent activated carbon particles which were spent by contact with hydrocarbons or any of the above fluids which comprises contacting the carbon particles with the mixture produced by the method described above. Here the mixture of the invention should have a particle size which is larger than the carbon particle size.

This invention is finally the product comprising the mixture produced by the method of described above having a size less than ¾" and often less than ⅜" and combined with a mineral/soil or plant based adsorbent for use as a adsorbent on local spills.

MATERIALS USED IN THE PROCESS OF THIS INVENTION

An examination of available materials for use as a precursor to peat moss found grass and alfalfa hay to be the best due to year-round availability and a marketplace in which to purchase. While other materials, such as corn stalks and soybeans, are available, they are so only seasonally. In addition, they have no established marketplace.

Original efforts looked at "square bales," however, the "field length" proved difficult to blend. In order to facilitate blending, the field length of 3" to 16" was reduced using a hammer mill to the gradation with the maximum length of 3 inches. This length proved acceptable for mixing with manure, municipal waste or similar waste, manufactured feedstock or a blend of these. However, if the mix was too wet, the mix would ball in the digester phase.

Balling would impact a portion or all of that batch and, when unloaded, would look like a bag of marbles. These balls were very dense and, when dried, resisted weathering. The marketplace would object to their presence, as well.

These trials used chicken manure from "wet" houses. The poultry houses had raised cages in which the birds were housed. The manure dropped approximately three feet into a gutter under the cages where the manure accumulated. Each house had approximately 50,000 birds. The gutters were then cleaned, using scrapers, into a discharge chute. The chutes had a chain conveyor which loaded the manure into equipment for application to adjacent farmland.

An alternative system used in the poultry business for egg layers is dry storage. The cages are raised above pits approximately ten feet in depth. The droppings are allowed to accumulate for about a year. The droppings are then removed, generally for land application.

In order to dry the droppings and prevent decomposition gas buildup in the buildings, the pits are heavily ventilated with fans. The operation of these fans is critical to prevent flock loss and is essentially a 24-hour, year round process.

In the case of broiler-type chickens, these are often raised on grade, usually on a concrete floor. Since the birds are only in the house for approximately eight weeks, the waste is allowed to accumulate. Normally, the waste is nearly dry at the time of removal. The manure is removed and house sanitized prior to another flock being introduced.

The industry has recently started pelletizing the dry poultry droppings as a fertilizer. The pellets are marketed under a number of trade names. These fertilizers are generally much more expensive than normal fertilizers and have been used primarily in golf course applications. It is of note that other manures have not been used in this dry form.

While most livestock manures from hogs and cattle contain hair, this is not as noticeable as the volume of feathers from poultry. While the feathers could, at least theoretically, be separated, the problem of what to do with the feathers removed still remains. Prior to this invention, there was no known use for them in this form. When these materials are land-applied, the feathers may become airborne and travel beyond the property. The feathers are particularly hard on the handling equipment, causing extensive wear.

The selection of poultry manure was based simply upon availability. Other manures will work, as well as municipal sludge. However, animal manures are a known commodity with consistent chemical and physical characteristics. Human waste from a wastewater treatment plant, however, present an end-use problem due to:

large variability in chemical and physical characteristics; and contains a number of disease vectors, as well as hazardous chemicals.

DESCRIPTION OF PROCESS OF THIS INVENTION

Three ingredients need to be blended or mixed in order to start the reaction:

1. Inoculum
2. Carrier
3. Manure, Municipal Waste and/or Similar Waste, manufactured feedstock or a blend of these The inoculum is a cellulose degrading microorganisms which can be an ammonia producing bacteria, a lignin cellulose degrading bacteria or a mixture of both. The lignin cellulose degrading microorganisms may be an anaerobic bacteria or a facultative bacteria or a mixture of them.

The community of microorganisms is large (>50 species) and consists of gram negative and gram positive bacteria. U.S. EPA has developed a test methodology to evaluate such a community utilizing Phospholipid Fatty Acids. The typical community composition found in this process is as follows:

| % of Total | |
| --- | --- |
| Terminally Branched Saturates | 11.6 |
| Monoenoics | 37.5 |
| Polyenoics | 25.7 |
| Branch Monoenoics | 2.8 |
| Mid-chain Branched Saturates | 2.8 |
| Normal Branched Saturates | 19.6 |

The carrier consists of hay or straw of small grains, such as wheat or oats. This cellulosic material is adsorptive, as well as difficult to degrade. This is purchased in bales with the material essentially at harvest length and is subject to size reduction with the longest length being 3.0 inch. Without size reduction, the material is extremely difficult to incorporate with the liquid and the inoculum.

The coarseness of the carrier is important to obtaining a good mix. A fine gradation results in balling or lumps. When subjected to the process, these become very, very hard and will withstand considerable weathering before breaking down.

To blend the carrier, liquid, and inoculum, a mixer is used. This mixer may consist of a number of conventional, readily-available mixers that can be used to mix batch or continuously. Those used include paddle, reel, ribbon, and multiple auger.

The mixer containing the carrier material is first inoculated with 10% to 20% by volume of material previously produced by this process. A greater volume of material may be used but does not appear to improve the process and reduces the production capacity of the machine. The purpose of the inoculum is to provide a base population of microorganisms of sufficient size to allow for rapid growth of the microorganisms throughout the mixture.

Manure, municipal waste or similar waste, manufactured feedstock or a blend of these is then added to the mixture, wetting the material. Additional carrier and manure, municipal waste or similar industrial waste is added until the capacity of the mixer is attained. At this time, the moisture content is between 30% and 45%. If more than 20% moisture is reached, the carrier will ball with similar results as noted above.

The exact amount of manure, municipal waste or similar waste, manufactured feedstock or a blend of these depends on the type of carrier, moisture content of the carrier, and percentage of solids in the manure. As soon as the mixture or waste reaches capacity, the mixing action should continue for less than five minutes before removal. Excessive mixing pulverizes the carrier. The material, upon removal from the mixer, often has an elevated temperature of 100° F. or greater. It is of note that by this stage the feathers have become indistinguishable.

The use of a carrier of dry vegetative residue adsorbs the liquid fraction, incorporating the dissolved nutrients into the carrier and concentrating the solids on the surface of the carrier. After blending the material, the mixer contents are then transferred to a separate chamber. In lab testing, this can be the mixer. However, economics dictate a separate vessel be used for the chamber for large volume manufacture.

The chamber performs the following functions:

1. Isolates the mixture from the oxygen in the atmosphere;
2. Prevents loss of moisture; and
3. Keeps the material at an even temperature throughout.

This chamber may be insulated to obtain more rapid temperature rises, as well as greater final temperatures.

The chamber may be made of any number of materials, such as wood, steel and concrete. The current chamber consists of a composite of these materials.

While in this chamber, the temperature is allowed to rise to a temperature of 135° F. to 175° F. The upper end of this range is more desirable. During this time, ammonia production is fully underway.

After a 24 to 36 hour incubation period, the carrier's natural color changes to a dark brown. This change is not only surficial but involves the entire cross-section of the carrier. It is of note that the physical shape and size are the same as at time zero of the process. During this time, considerable water vapor and other gases, such as ammonia are produced within the mass.

The change of coloration is the process indicator. When the mass has shown this change, it is subjected to rapid aeration in order to reduce moisture and temperature. The drying process causes the microorganisms or bacterial community that has developed to become dormant. The water vapor and other gases may be exhausted to the atmosphere or it may be captured for use as a liquid fertilizer.

The exhaust gas may be treated to remove the water vapor and ammonia. Several methods may be used; e.g., using diffuse aeration in a tank filled with water. The water may contain any number of water-soluble compounds, such as lime, which results in the ammonia going into solution. This solution can then be used as a nitrogen-rich liquid fertilizer.

The heating during fermentation causes the water to evaporate and leave the solids on the outside and the adsorbed nutrients within the carrier. These are then available slowly when incorporated in soil as the material degrades.

The material, once dried to less than 25% moisture, may be packaged as is or may be subject to additional processes such as particle size reduction, chemical or bacterial additives, depending on end use.

A normal production run uses addition of approximately 8-16 grams of feed grade urea per 500 lbs. of mixture to insure high ammonia content. For floricultural use, this is omitted in order to avoid ammonia toxicity. This allows a high percentage, equal to peat, of material in the soil mix. For turf end-uses, upwards of 64 ounces/500 lb. is practical, an 0.5-16 ounces/500 lb. addition is a minimum with 8 to 16 ounces/500 lbs. preferable for some low nitrogen applications, and 16-64 ouncess/500 lb is most preferred.

Since manure based products typically have a "high conductivity" or salt content, this has limited the use of the products made from them. A further process control is the measurement of the electroconductivity of the waste upon arrival. Based upon this value, water may be incorporated in order to reduce the salt level.

Either tap water or manufactured (deionized or distilled) water may be used for this purpose.

This process may use either dry or wet wastes. The use of dry wastes require the reliquifying of the waste in a mixer. The remainder of the process and controls are the same.

Different crops have different tolerances to salts. The turf target is generally +−10 mhos/centimeter$^2$, while floriculture is +−8 mhos/centimeter$^2$. For the use as a bioremediation product, this is not a factor.

Product Development

During the development process, the product was thought to adsorb hydrocarbon spills and potentially could be used as a carrier of other "oil eating" bacteria. As a result, a trial was set up using crude oil and diesel fuel with peastone. These laboratory trials were started during the time of the Valdez spill.

A bacterial culture with a proven record of degradation was incorporated with the product. Several levels of treatment, as well as a control of no added bacteria culture, i.e., the mixture of this invention, were used on both the crude oil and the diesel fuel, were used. The intended control (this invention) was found to be the better degrader of hydrocarbons.

Based upon this work, it was then decided to move to a sand material and use diesel fuel only. The diesel fuel was selected because of availability, little incorporation loss, and difficulty of biological degradation.

Additional bacterial culture were obtained from a company which claimed successful degradation. The results of this work are similar to the previous work. That is, the mixture of this invention was found to be a more effective degrader of hydrocarbons in diesel fuel.

Field Work

Field trials were performed in the winter of 1992 on an underground storage tank that included diesel fuel, kerosene and gasoline. The simple field incorporation of material is also included.

Additional trials were performed on soil contaminated with diesel fuel, gasoline, chlorinated and non-chlorinated solvents and cutting, waste, waste and hydraulic oils.

Based upon this work, it has been determined that the culture created is non-specific. A portion of this ability may be due to the nitrogen-forming and lignocellulosic degrading bacteria.

The trials show that after approximately 120 days, the concentration generally approaches the detection limits of the test methodology. The most current study on a blend of diesel fuel, gasoline, chlorinated and non-chlorinated solvents, cutting waste and hydraulic oils shows an approximately 100% reduction. While natural degradation may occur, infusions of bacteria add certainty to the process.

Product Uses

1. Soil Remediation

The product mixture of this invention may be used in all forms to remediate soil and water contaminated with hydrocarbon fuels, lubricants, solvents, dissolved metals, pesticides, highly energetic compounds, metals and radioactive materials. The product provides a unique system of adsorbent, inoculum of bacteria and nutrients. While the product is capable of remediation alone, it also stimulates any naturally-occurring bacteria.

Work was conducted on soils containing high levels of heavy metals to determine the effectiveness of various materials to fix the metals in the soil. This work was performed at Kansas State University as part of an E.P.A. study that looked at various amendments in order to revegetate large areas of mine tailings. The trials included various manures, composts, vegetable residues, and the product of the invention.

The soil-type tested was impermeable zinc and lead mine tailings containing 13,700 mb/kg of zinc, 89 mg/kg of lead, and 1150 mg/kg of cadmium. Tall fescue seeds were planted in the test soil amended with various rates of the invention product and other materials. Plant germination for soil amended with the invention product is shown in the following table. No other product tested resulted in any given germination or growth.

| rate<br>% (wt/wt) | Invention<br>Product<br>% germination |
| --- | --- |
| 2.5 | 1.1 |
| 5.0 | 18 |
| 7.5 | 13 |
| 10 | 23 |
| 15 | 52 |

It was further found that the zinc concentration was the lowest of all materials tested in the tall fescue plants grown in the mine tailings amended with 20% of the invention product (44 mgZn/kg plant). This concentration in the fescue tissue is typical of that found in "clear" topsoil. The study concluded that the invention product was superior in restricting zinc uptake.

2. Peat Replacement

In its original and manipulated form, the product of this invention may be used as replacement for peat and compost products in the horticulture, floriculture, and turf industries.

The product can be manipulated chemically to increase nutrients. In fact, the addition of a nitrogen source, such as urea, can be used to increase the ammonia content of the product. Such an increase is extremely beneficial to the turf industry since grass uptakes nitrogen as ammonia. In addition, specific gradations can be produced using conventional particle reduction and screening equipment. This designer gradation allows the use of locally available soils instead of imports which are being trucked thousands of miles to the location.

Evaluation of this material is currently underway at Iowa State University and Turf Diagnostics & Design of Olathe, Kans.

The comment by the Iowa State University researcher indicated that water-holding capacity was excellent and that the pots with chrysanthemums had a lightness similar to peat. The other composts in the trial did not have this lightness and showed other physiological impacts.

Turf studies were performed at ISU. The material performed very well. In fact, the material showed a much greater available water-holding capacity than peat and other composts. The success of this product resulted in the evaluation by a commercial testing facility which is considered the leader in testing in the golf turf and sport turf fields.

In the opinion of the testing facility's head technical person, the product is "the best man-made product they have tested." In fact, certain aspects, such as fiber content, are better than peat. He also commented on the high moisture adsorbing capacity of the material.

2.a. Biobed Concept

Today the turf industry uses essentially sand beds for greens and tees, as well as sports arenas. Sand is used in order to provide optimum drainage to allow play under all but the most adverse weather conditions. In order to add some water-holding capacity, peat moss is added at the rate of 10% to 20% by weight.

A major problem with this type of construction is that the same beds that provide good drainage do not support a significant microbial population. As a result, significant levels of nutrients and pesticides are leached.

Based upon the $CO_2$ results of the remedial work, the population in material of this invention is vigorous and virile. When mixed within these soil blends, the amounts of fertilizer and pesticides which drain from the turf will be reduced due to biological activity. In addition, the amount of pesticides required, primarily fungicides, will be reduced or eliminated.

The bed may be periodically infused in the turf applications by using current plugging and top dressing techniques. This method may be used to infuse an existing bed built previously using peat or organic additive.

Turf Diagnostics and Design conducted a study to evaluate the ion exchange capacity of the invention product blended with a turf benchmark silica sand used to build golf greens. This sand has an extremely low cation exchange capacity.

A sand that meets the USGA particle size distribution was selected to make mixes with the invention product and also commonly used high quality peat (Dakota Reed Sedge) and Alberta Sphagnum peat. The physical performances of the mixes was determined using the USGA methods.

The results are summarized in the following table.

|  | Cation Exchange capacity MEQ/100 g. |
| --- | --- |
| 90% Gillibrand Sand/ 10% Dakota Reed Sedge Peat | 2.9 |
| 80% Gillibrand Sand/ 20% Alberta Sphagnum Peat | 2.1 |
| 90% Gillibrand Sand/ 10% Rebuild | 6.2 |

This result is considerably greater than one would expect from compost. Also, it should be noted that the CEC value measured above closely approximates the zinc uptake experience described above in connection with the soils containing mine tailings studies conducted at Kansas State University.

3. Spill Absorbent/Degradent

The product of this invention may be reduced in size to less than ¾", often less than ⅜" and incorporated with mineral/soil based adsorbent or plant-based adsorbents.

The mix is then placed in local hydrocarbon oil, solvent or pesticide spills and the spilled material is allowed to be fully adsorbed. The spent adsorbent is then collected and allowed to be biodegraded rather than be removed from the site for disposal. The combined material would then be taken to a control area to undergo the biological reaction.

A minimum of 10% of the product of this invention must be incorporated in order to get a sufficient biological reaction.

4. Boom for Spill Control

The material of this invention in its various gradations may be incorporated into a fabric tube or other shape to form a boom. Since the product of this invention has a long bacterial shelf life, as well as its adsorptive capacity, this provides an improvement over current technology which is based upon synthetic adsorptive fiber.

5. Air Filtration

The product of this invention in its raw form may be installed into a bed filter or packed column that would adsorb material from the incoming air and biologically degrade or fix them. A coarse gradation is necessary to prevent high head losses. These contaminants include but are not limited to volatile organic carbon, aromatic, metals and odors. The spent filter contents can simply be allowed to degrade and then be land-applied.

6. Recovery of Activated Carbon

Spent by hydrocarbons, pesticides, highly energetic compounds and/or solvents, activated carbon can be generated or remediated using the product of this invention in its various forms. However, the smallest particle must be larger than the largest carbon particle in order to allow separation of the two solids. The amounts necessary are similar to these for soil and other spent adsorbents. The carbon can then be screened to remove the product and the carbon recycled to its prior use or disposed.

7. Absorbent for Surface Spills

The product of this invention in its original size or smaller can be applied using conventional spreading techniques to the surface of a hydrocarbon, solvent or pesticide spill. The material will adsorb up to four times its weight in hydrocarbons, as well as provide nutrients and bacteria to degrade the spill.

8. Pretreatment for Sodding

A major problem where land is used for houses and commercial and industrial buildings is the establishment of turf. Generally, when these areas are developed, the top soil is scalped and sold. What remains is a compacted subsoil.

The industry generally seeds or sods these areas, but a quality turf is seldom established. This is due to the limited rooting caused by the equipment compaction.

In order to overcome this problem, the product of this invention is worked into the top six inches at a rate up to 30% by weight. This provides an interface that allows for full rooting. The other material benefits include increased fertility and bacteria infusion.

EXAMPLES

The following is an example of the actual manufacturing process. Typical values are used to illustrate the process. Because we are dealing with natural products, a range of measured values is normally encountered.

The plant material such as straw or hay is received in large round bales weighing approximately 1,000 pounds. These bales are loaded into a large tub grinder which reduces them to the desired gradation. The tub grinder uses a hammer mill for this reduction. The gradation obtained is a function of screen size in the hammer mill.

Once the plant material is reduced, several samples are obtained from the batch and the moisture content is measured using a conventional laboratory moisture balance (Example value: 10% by weight).

The liquid manure, municipal waste, manufactured feedstock or a blend of these or the like is delivered to the manufacturing location and a representative grab sample taken. Then the electroconductivity of the sample is measured using a conventional electroconductivity meter. (Example value: 20 mhos/cm$^2$).

The potable water is a previously measured value at the location. (Example value: 1 mhos/cm$^2$).

The target value of this batch is 10 mhos/cm$^2$, calculated using simple proportions the necessary volumes of each constituent in order to obtain the desired value.

As an alternative to the manure/waste solution, a manufactured feedstock using inorganic chemicals to provide specific elements can be used with similar results. Typically, the target concentrations and conductivity would be in the same range as those used with the manure or water-based system.

The use of this feed stock provides the following additional benefits:

1) Reduces the ash portion of the final product, i.e. increases the organic percentage;
2) Provides a feedstock which can result in the absence of specific compounds.

The manufactured feedstock, as well as the blend of manure or other waste, will provide additional quality controls and increase design options of the final product.

Then the two liquids are pumped into a tank in the proportions calculated. The contents are mixed thoroughly and once again its conductivity is measured.

Once the conductivity is validated, the next step in the process begins. Since this is done on a large scale, the volumes are cubic yards.

For the purpose of this example, a four-yard mixer is used. First one cubic yard of inoculum or seed material from an active fermentation cell is added. Then a nitrogen source is added (for this example, granular urea). (Example value: 1 ounce.) Note: In some products, additional nitrogen is not necessary. The two materials are allowed to become completely blended before progressing.

Approximately three cubic yards of the ground plant material (straw) are then added along with a small volume of liquid, e.g., manure, to aid in the mixing process. Then more liquid is added until the mix is completely wet. Then the mix is measured for its moisture content. Additional liquid is then added until the mix is within range (Example value: 30%).

The mixture is allowed to blend for a short period of time (Example value: three minutes).

A simple calculation similar to that used for electroconductivity has not proven workable since different species of small grains and grass have different adsorption capacities. In addition, the proportion of a specific species in a bale is random at best.

With experience, it has been possible to mix this very closely by feel, but a moisture test is necessary to maintain quality.

Then the mixer is emptied and the contents are placed into a fermentation chamber (Example value: 4 cubic yards in volume) and the contents sealed. The temperature, which is monitored regularly, then rises (Example value: 165 degrees Fahrenheit in 30 hours) and the contents are visually inspected. If the material is a deep brown, the process is terminated.

The chamber is then aerated using a vacuum pump to draw the air through the mass. The aeration removes water vapor, other gases, and heat from the mass (Example value: 2 hours). The temperature is brought to room temperature and the moisture for this example is 20%.

The dry material may then be bagged or further reduced in particle size.

What is claimed is:

1. A method to produce a substitute for peat moss comprising:

mixing adsorptive cellulosic carrier material with an inoculum containing lignin cellulose degrading microorganisms in a fermenter in an effective amount sufficient to allow for rapid growth throughout the fermenter and a liquid feedstock consisting essentially of a manure, or municipal waste or a blend of these to form a mixture having a moisture content of up to 25% by weight and wherein liquid and dissolved nutrients are absorbed into the carrier material and solids are concentrated and bacteria grows on a surface of the carrier material, transferring said mixture to a chamber to isolate the mixture from atmospheric oxygen, prevent loss of moisture, and maintain the mixture at even temperature throughout, increasing the temperature of said mixture in said chamber to a temperature of 135° to 175° F. and forming a moist atmosphere containing ammonia and maintaining the mixture at this temperature until said cellulosic material changes from a natural color to a dark brown color, then aerating said mixture to reduce the temperature and to remove water vapor, ammonia and other gases found in the mixture in an exhaust gas and continuing aeration until the mixture is dried to less than 25% by weight moisture and causes microorganisms or bacterial community that has developed to become dormant and then removing said mixture from said chamber containing carrier material having substantially same physical shade and size as initially mixed for use as a substitute for peat moss.

2. The method of claim 1 wherein said inoculum comprises 10% to 20% by volume of a substitute peat moss produced according to claim 1.

3. The method of claim 1 wherein the cellulosic material is selected from the group consisting of hay, straw and stalks of plants such as corn or soybeans and having a maximum length of three inches.

4. The method of claim 1 wherein between about 10% and 20% by weight of inoculum is added to the cellulosic material.

5. The method of claim 1 wherein additional cellulosic material and manure or municipal waste are subsequently added to fill the fermenter to its capacity.

6. The method of claim 5 wherein said method is continuous and mixing continues for a time up to five minutes after said capacity is reached.

7. The method of claim 1 wherein the temperature in the chamber rises to between about 145° F. to 175° F.

8. The method of claim 1 wherein said mixture remains in said chamber for from about 24 to about 36 hours after the temperature begins to rise.

9. The method of claim 1 wherein said chamber is insulated.

10. The method of claim 1 wherein said aeration continues until said mixture is dried to less than 25% by weight moisture.

11. The method of claim 1 wherein water vapor, ammonia and other gases are removed from said exhaust gas.

12. The method of claim 11, wherein said recovery is by passing said exhaust gas through water.

13. The method of claim 12 wherein the water contains lime.

14. The method of claim 1 comprising an additional step of adding urea to the mixture.

15. The method of claim 14 wherein the amount of urea added is from about 0.5 to about 64 ounces/500 lbs. of mixture.

16. The method of claim 1 wherein electroconductivity of the feedstock is measured prior to mixing to determine whether dilution is needed to reduce conductivity of the feedstock.

17. A substitute peat moss produced by the method of claim 1.

18. The method of claim 1 wherein the method is continuous.

* * * * *